(12) United States Patent
Kremer et al.

(10) Patent No.: US 11,621,741 B2
(45) Date of Patent: Apr. 4, 2023

(54) ADAPTIVE MODULATION, CODING AND SPREADING (AMCS) TRANSMITTER, RECEIVER AND METHODS

(71) Applicant: Raytheon BBN Technologies Corp., Cambridge, MA (US)

(72) Inventors: Michael Brandon Kremer, Somerville, MA (US); Andrew C. Marcum, Reston, VA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 0 days.

(21) Appl. No.: 17/668,893

(22) Filed: Feb. 10, 2022

(65) Prior Publication Data
US 2022/0271792 A1   Aug. 25, 2022

Related U.S. Application Data

(60) Provisional application No. 63/153,572, filed on Feb. 25, 2021.

(51) Int. Cl.
*H04W 28/04* (2009.01)
*H04B 1/707* (2011.01)
(Continued)

(52) U.S. Cl.
CPC ............. *H04B 1/707* (2013.01); *H04L 5/006* (2013.01); *H04L 27/2626* (2013.01); *H04W 28/04* (2013.01)

(58) Field of Classification Search
CPC ..... H04W 28/04; H04W 28/06; H04W 72/04; H04W 4/18; H04W 72/042; H04W 52/146; H04W 52/325; H04W 72/12; H04W 74/02; H04L 1/0003; H04L 1/0009; H04L 1/0025; H04L 1/0007; H04L 1/0029; H04L 27/0012; H04L 2025/03414;
(Continued)

(56) References Cited

U.S. PATENT DOCUMENTS

| | | | |
|---|---|---|---|
| 8,494,457 B2 * | 7/2013 | Zheng | H04L 5/0044 455/77 |
| 10,389,570 B2 * | 8/2019 | Murakami | H04L 1/06 |

(Continued)

*Primary Examiner* — Eva Y Puente
(74) *Attorney, Agent, or Firm* — Schwegman Lundberg & Woessner, P.A.

(57) ABSTRACT

An adaptive modulation, coding and spreading (AMCS) transmitter is configured to map modulation symbols to a plurality of OFDM subcarriers to generate symbol-modulated subcarriers. For AMCS, some of the modulation symbols may be mapped to individual subcarriers (e.g., similar to conventional OFDM) and one or more of the modulation symbols may be mapped to (i.e., spread across) more than one of the subcarriers (i.e., unlike conventional OFDM) based on a spreading ratio. An IFFT may be performed on the symbol-modulated subcarriers prior to transmission. AMCS allows for adaptation to lower capacity and/or frequency-selective channels by optionally spreading existing modulations over multiple carriers and/or time slots. AMCS expands the catalog for possible modulations/codings by splitting a symbol across multiple carriers and/or time slots. AMCS is particularly useful when channel conditions are highly frequency-dependent or uniformly low capacity.

20 Claims, 6 Drawing Sheets

(51) Int. Cl.
*H04L 5/00* (2006.01)
*H04L 27/26* (2006.01)

(58) Field of Classification Search
CPC ........ H04L 2025/03426; H04B 7/0452; H04B 7/0671; H04B 7/0689; H04B 7/12; H04B 7/0617; H04B 1/707; H04B 7/2603; H04B 1/66
USPC ......................................................... 375/146
See application file for complete search history.

(56) References Cited

U.S. PATENT DOCUMENTS

| | | | |
|---|---|---|---|
| 10,608,789 B2* | 3/2020 | Yun | H04L 5/001 |
| 2005/0025039 A1* | 2/2005 | Hwang | H04L 5/0044 |
| | | | 370/206 |
| 2008/0075195 A1* | 3/2008 | Pajukoski | H04L 5/0016 |
| | | | 375/298 |
| 2011/0129028 A1* | 6/2011 | Lee | H04L 25/03171 |
| | | | 375/262 |

* cited by examiner

ADAPTIVE MODULATION, CODING AND SPREADING (AMCS) TRANSMITTER, RECEIVER AND METHODS

PRIORITY CLAIM

This application claims priority under 35 USC 119 to U.S. Provisional Patent Application Ser. No. 63/153,572, filed Feb. 25, 2021 [reference number 21-14906-US-PSP] which is incorporated herein by reference in its entirety.

TECHNICAL FIELD

Embodiments pertain to wireless communications. Some embodiments relate to orthogonal frequency division multiplex (OFDM) communications. Some embodiments pertain to Adaptive Modulation and Coding (AMC). Some embodiments pertain to adaptive spreading.

BACKGROUND

One goal of communicating through a wireless channel is optimizing or maximizing the channel's data carrying capacity. OFDM utilizes multiple closely-spaced orthogonal subcarrier signals with overlapping spectra that are transmitted in parallel. Conventional techniques that utilize a single modulation and constant time and/or frequency spreading ratio for all subcarriers yield suboptimal performance. This is particularly an issue with changing channel conditions and for channels with poor performing subcarriers. Thus there are general needs for wireless communication that optimizes a channel's data carrying capacity.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments disclosed herein are directed to Adaptive Modulation, Coding, and Spreading (AMCS). AMCS allows for adaptation to lower capacity and/or frequency-selective channels by optionally spreading existing modulations over multiple carriers and/or time slots. AMCS expands the catalog for possible modulations/codings by splitting a symbol across multiple carriers and/or time slots. AMCS is particularly useful when channel conditions are highly frequency-dependent or uniformly low capacity. These embodiments are described in more detail below.

In some embodiments, AMCS assumes varied SNR over frequency, known at transmitter and receiver. In this case, using a single modulation and constant time and/or frequency spreading ratio for all subcarriers would yield suboptimal performance. In these embodiments, AMCS may optimize the modulation at each subcarrier based on the available information, which is either completely offline or with respect to online feedback from the receiver. In some embodiments, a subset of the available subcarriers over time and frequency may be chosen to "cover" the SNR requirement for an efficient, coded modulation, e.g. QPSK with rate 2/3 coding. In some embodiments, AMCS expands the catalog for possible modulations/codings by splitting a symbol across multiple carriers and/or time slots. Useful when channel conditions are highly frequency-dependent or uniformly low capacity. These embodiments are described in more detail below.

Some embodiments are directed to an adaptive modulation, coding and spreading (AMCS) transmitter. In these embodiments, the AMCS transmitter is configured to map modulation symbols to a plurality of OFDM subcarriers to generate symbol-modulated subcarriers. In these embodiments, some (i.e., most but not all) of the modulation symbols may be mapped to individual subcarriers (e.g., similar to conventional OFDM), and one or more of the modulation symbols may be mapped to (i.e., spread across) more than one of the subcarriers (i.e., unlike conventional OFDM) based on a spreading ratio. In these embodiments, the AMCS transmitter may be configured to perform an IFFT on the symbol-modulated subcarriers prior to transmission.

In some embodiments, the plurality of OFDM subcarriers may comprise a first set of OFDM subcarriers and a second set of OFDM subcarriers. Each set may comprise more than one subcarrier. In these embodiments, some of the modulation symbols may each be mapped to a single one of the subcarriers of the first set like conventional OFDM. In these embodiments, the one or more other modulation symbols may be mapped to (i.e., spread across) groups of two or more subcarriers of the second set. In these embodiments, the one or more other modulation symbols that are mapped to all the subcarriers of the second set are only mapped to the subcarriers of the second set (i.e., they are not mapped to any of the subcarriers of the first set).

In these embodiments, some modulation symbols are spread across frequency (i.e., repeated on more than one subcarrier). In some other embodiments, the modulation symbols may be spread across time and/or frequency. In these embodiments, a variable-sized bin may be used for optimization of the allocation. In these embodiments, the subcarriers/timeslots may be viewed as the bins which are covered with symbols. These and other embodiments are discussed in more detail below.

In some embodiments, the AMCS transmitter may also be configured to select the subcarriers for the first set and the second set based on a performance metric associated with a channel response. In these embodiments, subcarriers meeting the performance metric are selected to be in the first set, and subcarriers not meeting the performance metric are selected to be in the second set.

In some embodiments, the performance metric may comprise a signal-to-noise ratio (SNR) (e.g., an SNR threshold), although the scope of the embodiments is not limited in this respect. In these embodiments, subcarriers that fall below a SNR threshold are selected to be in the second set although the scope of the embodiments is not limited in this respect as other performance metrics may be suitable such as a signal-to-interference and noise ratio (SINR), channel state information, etc.

In some embodiments, the AMCS transmitter may select a modulation and coding scheme (i.e., MCS level) for each the subcarriers of the first set based, at least in part, on the performance metric. In these embodiments, for the subcarriers of the second set, the AMCS transmitter may select either a lowest or predetermined MCS level (e.g., BPSK) although the scope of the embodiments is not limited in this respect.

The MCS level may include a coding rate (e.g., 1/2, 3/5, . . . ) and a modulation level (M-PSK, M-QAM, . . . ). In these embodiments, for each the subcarriers of the first set, an MCS level may be selected based on the subcarrier's data carrying capability which may be determined from the SNR for that subcarriers. In these embodiments, higher MCS levels (e.g., 64QAM, 128QAM, 256QAM) may be selected for subcarriers of the first set that have a higher data carrying capability, and lower MCS levels (e.g., BPSK, QPSK, 16QAM) are selected for subcarriers of the first set that have lower data carrying capability. In these embodiments, adaptive modulation and coding (AMC) is applied to the subcarriers of the first set.

In some embodiments, the MCS may be pushed up to next higher level and spreading may be performed. In these embodiments, the AMCS transmitter may identify any subcarriers of the first set in which a data transmission rate based on the selected MCS level is less than an achievable data transmission rate by at least predetermined amount. In these embodiments, the achievable data transmission rate may be determined based on the performance metric. In these embodiments, the AMCS transmitter may select a next higher MCS level for the modulation symbol for the identified subcarrier and map the modulation symbol to the identified subcarrier of the first set and to one or more subcarriers of the second set. In these embodiments, a higher date transmission rate may be achieved than by utilizing the initially selected MCS level for certain subcarriers of the first set. In these embodiments, a next-higher MCS level is selected for these subcarriers, which would normally not be achievable by itself, however the spreading of these modulation symbols across other subcarriers allows a higher data transmission rate to be achieved.

In some embodiments, for the subcarriers of the second set, the AMCS transmitter may select an MCS level and the spreading ratio. The spreading ratio may indicate a number of subcarriers of the second set over which a modulation symbol is mapped across (i.e., spread or repeated). In these embodiments, when a spreading ratio of two is selected, for example, a modulation symbol may be mapped to two OFDM subcarriers of the second set. When a spreading ratio of three is selected, for example, a modulation symbol is mapped to three OFDM subcarriers of the second set. On the other hand, for no spreading is performed for subcarriers of the first set (i.e., a spreading ratio of one is used for subcarriers of the first set).

In an example embodiment that includes 20 total OFDM subcarriers in which 14 subcarriers are selected for the first set and 6 are selected for the second set, individual modulation symbols are mapped to each of the subcarriers of the first set (i.e., 14 modulation symbols). For a spreading ratio of two, one modulation symbol is mapped to each group of two modulation subcarriers of the second set. Thus, 18 modulation symbols are able to be transmitted. This is an improvement over conventional OFDM which would not transmit any symbols on the subcarriers of the second set.

In some embodiments, the AMCS transmitter may map ((i.e., spread) a modulation symbol to non-adjacent subcarriers of the second set (i.e., subcarriers of the second set do not need to be adjacent). In some embodiments, for the subcarriers of the second set, the MCS level and the spreading ratio are selected to maximize a number of modulation symbols for transmission on the subcarriers of the second set. In some embodiments, for the subcarriers of the second set, the MCS level and the spreading ratio are selected to maximize the number of bits for transmission on the subcarriers of the second set.

In some embodiments, good performing subcarriers may be combined with poor performing subcarriers. In these embodiments, more than one modulation symbol may be spread/repeated on a subcarrier of the first set and a subcarrier of the second set to increase the transmission rate, although the scope of the embodiments is not limited in this respect.

In some embodiments, the channel response may comprise channel feedback for each of the subcarriers or groups of the subcarriers, the feedback provided by a AMCS receiver. In some embodiments, the channel response may be based on RF propagation in the channel measured in situ. In some embodiments, the channel response may be known or predetermined. In some embodiments, AMCS may be performed on a known portion of the channel.

In some embodiments, the AMCS transmitter may be configured to predict the channel response. In these quantum-aperture embodiments, the channel response may be induced in the channel and is predictable.

In some of the other embodiments in which the modulation symbols are spread across time, for single-carrier time-domain modulation the AMCS transmitter may be configured to switch between modulation and coding schemes for a bin (e.g., switch between BPSK, QPSK, QAM, 1/2 rate spread BPSK, 1/3 rate spread BPSK, 1/4 rate spread BPSK, etc.).

Some embodiments are directed to a non-transitory computer-readable storage medium that stores instructions for execution by processing circuitry an adaptive modulation, coding and spreading (AMCS) transmitter. In these embodiments, the processing circuitry may be configured to map modulation symbols to a plurality of OFDM subcarriers to generate symbol-modulated subcarriers. Some of the modulation symbols are mapped to individual subcarriers and one or more of the modulation symbols are mapped to more than one of the subcarriers (i.e., unlike conventional OFDM) based on a spreading ratio.

Some embodiments are directed to an adaptive modulation, coding and spreading (AMCS) receiver. In these embodiments, the AMCS receiver may be configured to perform a fast-Fourier transform (FFT) on a received time-domain OFDM signal to generate a frequency domain signal comprising a plurality of symbol-modulated OFDM subcarriers. The AMCS receiver may also be configured to demap the symbol-modulated subcarriers to generate modulation symbols based on control signalling. In these embodiments, some of the modulation symbols may be generated from individual subcarriers some of the modulation symbols may be generated from more than one of the subcarriers based on a spreading ratio. In some embodiments, the control signalling may indicate subcarriers of a first set that were mapped with single modulations symbols and indicating subcarriers of a second set that were mapped with spread modulation symbols.

In some embodiments, for each subcarrier of the first set, the control signalling may indicate a modulation and coding scheme (MCS) for use in generating decoded bits. For the subcarriers of the second set, the control signalling may indicate which subcarriers that a modulation symbol are spread across and a MCS associated with those subcarriers.

Figure 1:
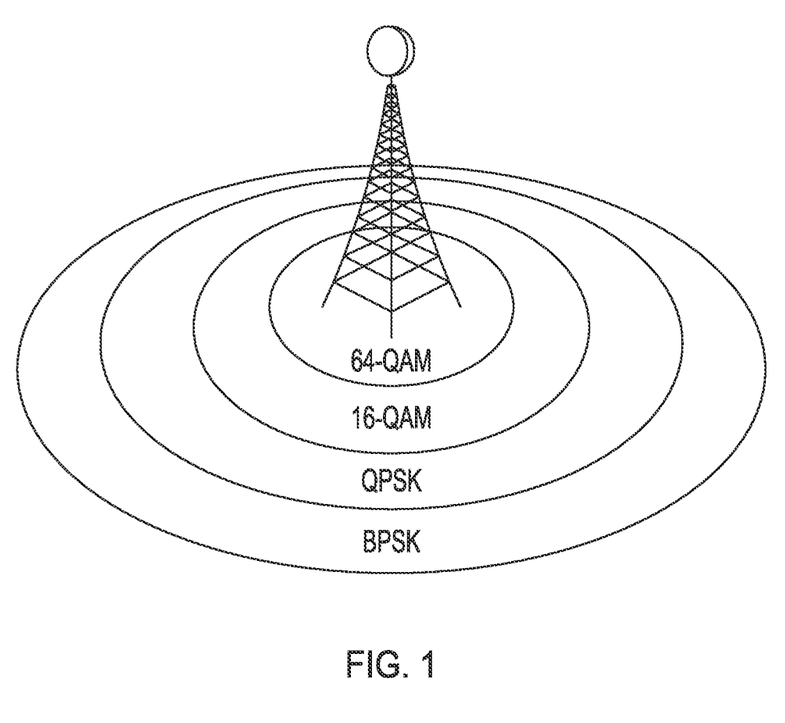
FIG. 1 illustrates an example of achievable modulation and coding rates vs distance from a transmitter or receiver.

FIG. 1 illustrates an example of achievable modulation and coding rates vs distance from a transmitter or receiver. As shown in FIG. 1, lower data capacities conventionally result as transmission distance increases.

Figure 2:
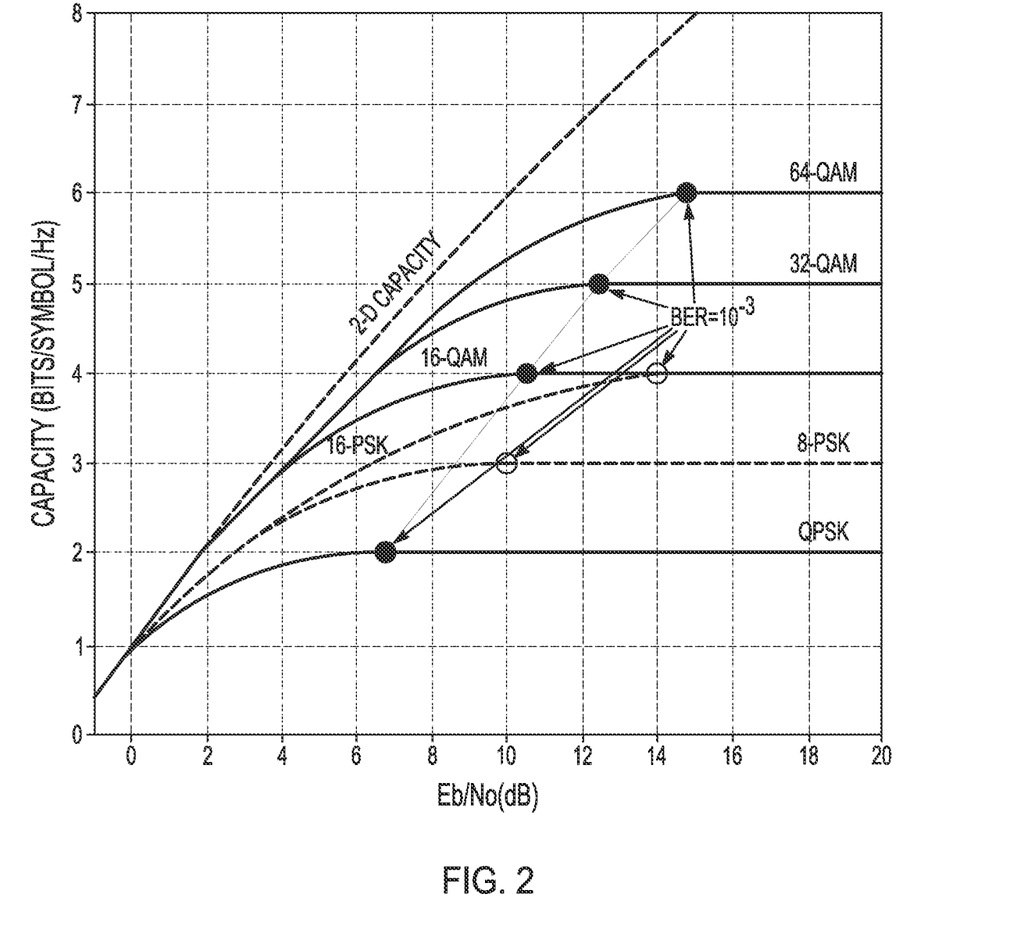
FIG. 2 illustrates subcarrier capacity for various modulation and coding schemes, in accordance with some embodiments.

FIG. 2 illustrates subcarrier capacity for various modulation and coding schemes, in accordance with some embodiments. As shown in FIG. 2, channel capacity (i.e., bits/symbol/Hz) max out as the normalized signal-to-noise per bit (Eb/No) increases.

Figure 3A:
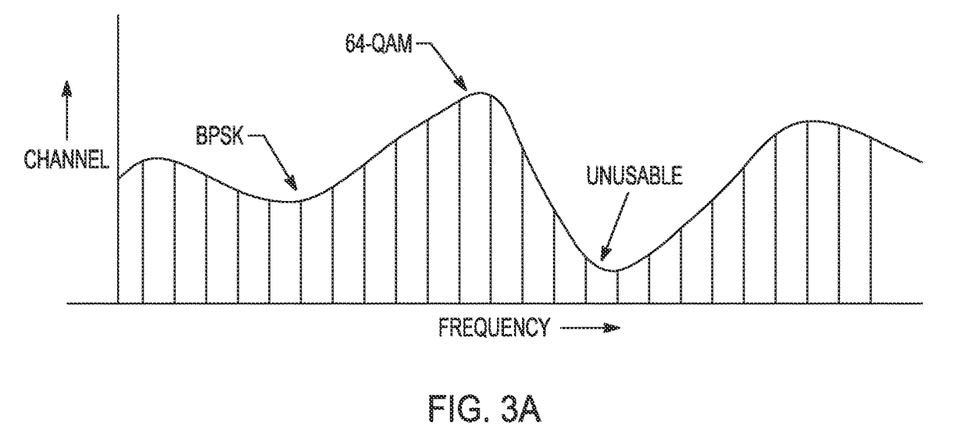
FIG. 3A illustrates an example of the variation in channel conditions across frequency, in accordance with some embodiments.

FIG. 3A illustrates an example of the variation in channel conditions across frequency, in accordance with some embodiments. As illustrated in FIG. 3A, higher modulation levels (e.g., 64-QAM) may be applied to subcarriers with better channel conditions while lower modulation levels (e.g., BPSK) may be applied to subcarriers with poor channel conditions. In some embodiments, for subcarriers having poor channel conditions, or subcarriers that are unstable, a symbol may be spread across multiple subcarriers or time slots. These embodiments are described in more detail below.

Figure 3B:
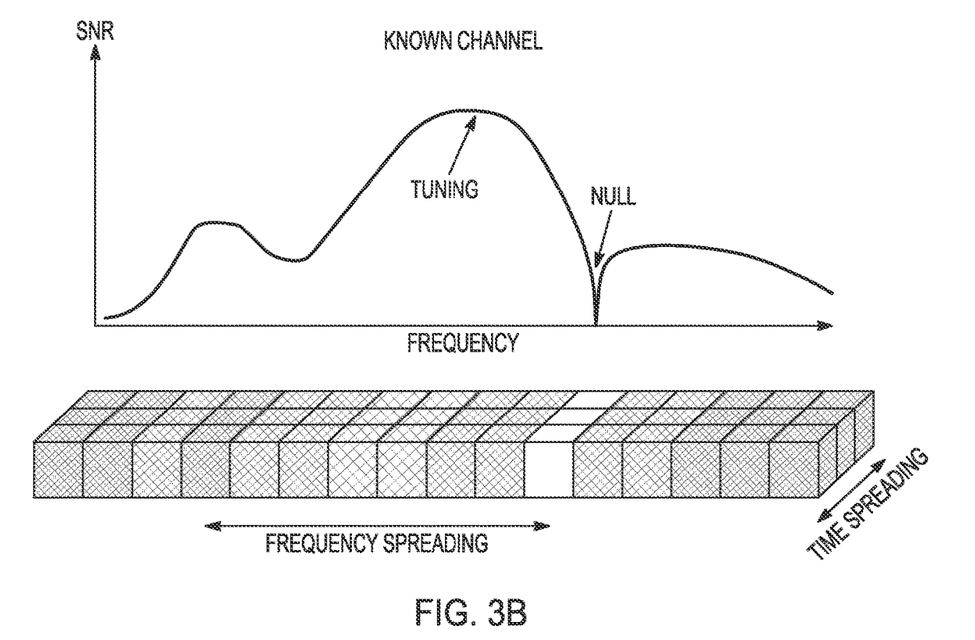
FIG. 3B illustrates frequency and time spreading in accordance with some embodiments.

FIG. 3B illustrates frequency and time spreading in accordance with some embodiments. As illustrated in FIG. 3, a modulation symbol may be spread across frequency (i.e., across more than one subcarrier) and/or across time.

Figure 3C:
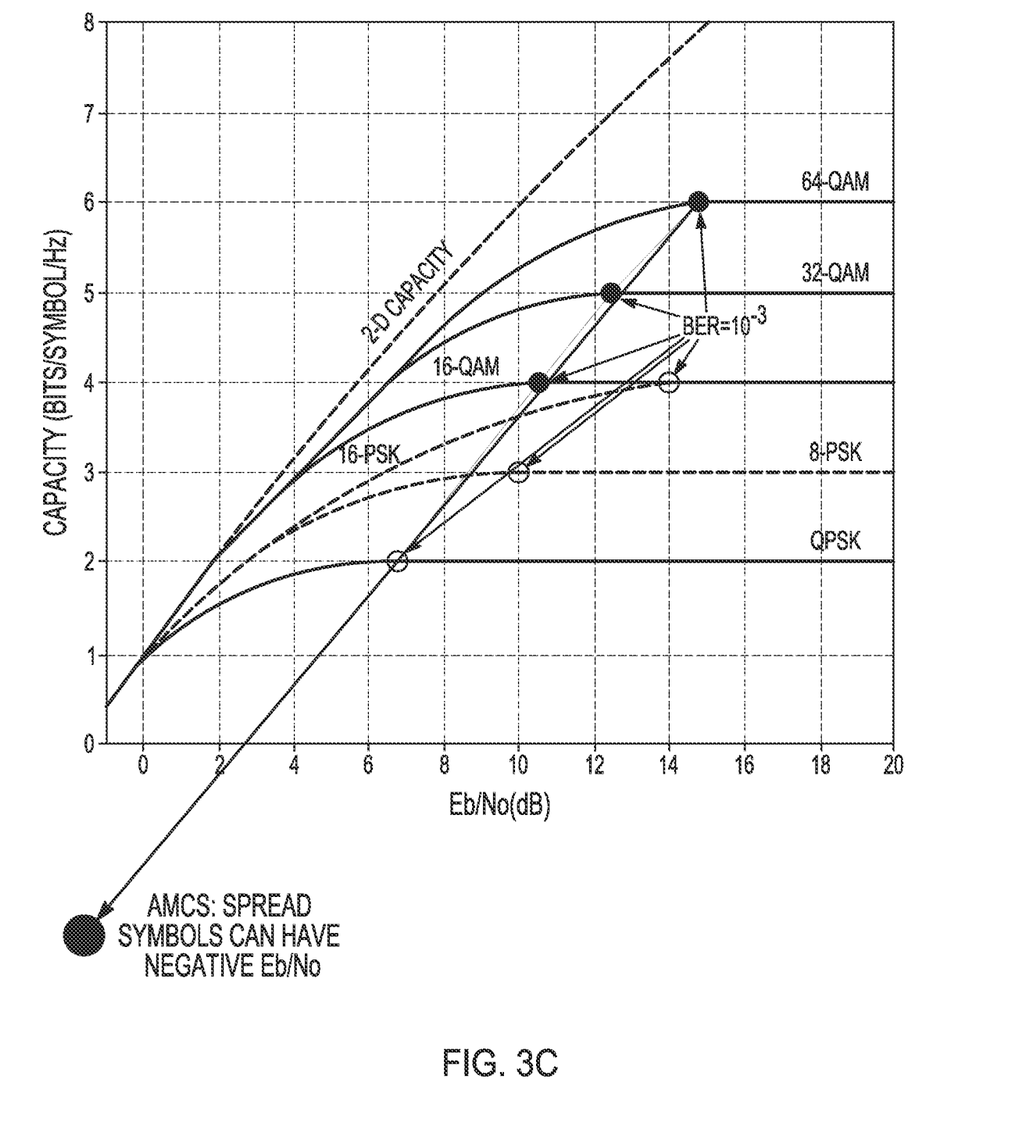
FIG. 3C illustrates subcarrier capacity for various modulation and coding schemes, with AMCS, in accordance with some embodiments.

FIG. 3C illustrates subcarrier capacity for various modulation and coding schemes, with AMCS, in accordance with some embodiments. As illustrated, AMCS as described herein may combine energy from multiple symbols.

Figure 4:
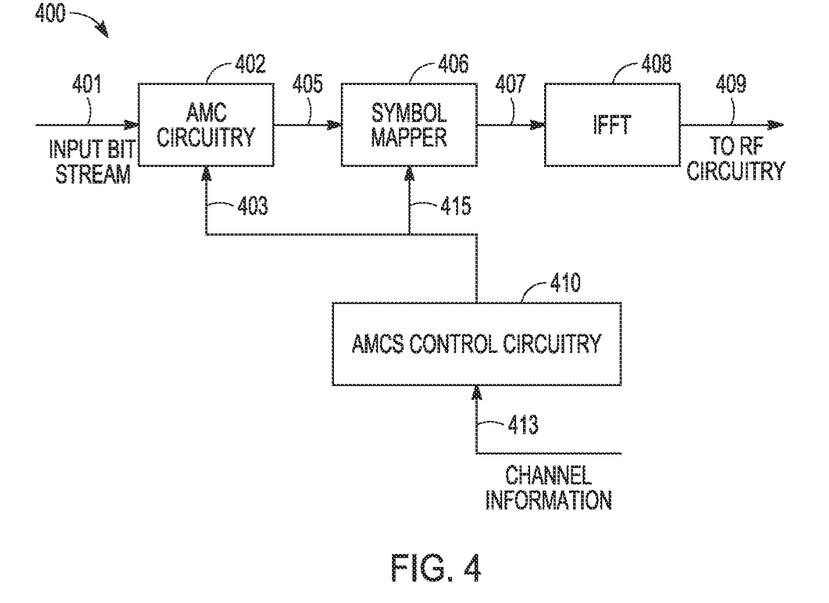
FIG. 4 illustrates a function block diagram of an AMCS transmitter in accordance with some embodiments.

FIG. 4 illustrates a function block diagram of an AMCS transmitter in accordance with some embodiments. AMCS transmitter 400 may comprise an adaptive modulation, coding and spreading (AMCS) controller 410. AMCS transmitter 400 may also comprise adaptive modulation and encoding (AMC) circuitry 402 to encode an input bit stream 401 and generate the modulation symbols 405 based on an MCS level 403. AMCS transmitter 400 may also comprise a symbol mapper 406 to map the modulation symbols 405 to subcarriers to generate a frequency domain signal comprising the symbol-modulated subcarriers 407. AMCS transmitter 400 may also comprise IFFT circuitry 408 to perform an IFFT on the symbol-modulated subcarriers 407 to generate a time-domain output signal 409 from the frequency domain signal comprising the symbol-modulated subcarriers 407 for subsequent upconversion to an RF frequency for transmission. In these embodiments, the AMCS controller 410 may be configured to select the subcarriers for the first set and select the subcarriers for the second set based on a performance metric associated with a channel response 413 and determine the MCS level 403 for the AMC circuitry. The AMCS controller 410 may also be configured to determine a spreading ratio for subcarriers of the second set and provide control signalling 415 to the symbol mapper 406 to indicate the spreading ratio and to indicate which subcarriers are in the second set. In these embodiments, the symbol mapper 406 may be configured to map one or more other modulation symbols to the subcarriers of the second set based on the spreading ratio. In some embodiments, memory may be configured to store the MCS level for each subcarrier of the first set and the spreading ratios for the subcarriers of the second set.

Figure 5:
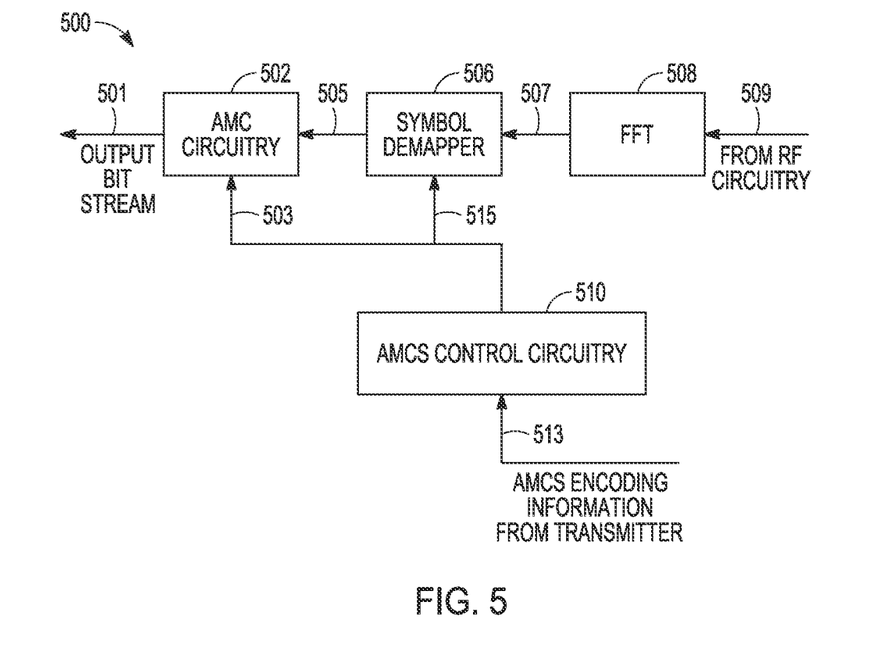
FIG. 5 illustrates a function block diagram of an AMCS receiver in accordance with some embodiments.

FIG. 5 illustrates a function block diagram of an AMCS receiver in accordance with some embodiments. In these embodiments, the AMCS receiver 500 may include FFT circuitry 508 to perform the FFT on a received time-domain OFDM signal 509 to generate a frequency domain signal 507 comprising a plurality of symbol-modulated OFDM subcarriers, a symbol demapper 506 to demap the symbol-modulated subcarriers to generate modulation symbols 505 based on control signalling 515, and AMC circuitry 502 to generate an output bit stream 510 from modulation symbols based on the control signalling 503. In these embodiments, the control signalling 503 and control signalling 515 may be generated by AMCS control circuitry 510 based on AMCS encoding information that may be provided by an AMCS transmitter that send the signals. In some embodiments, AMC circuitry 502, symbol demapper 506 and AMCS control circuitry 510 may comprise processing circuitry.

Figure 6:
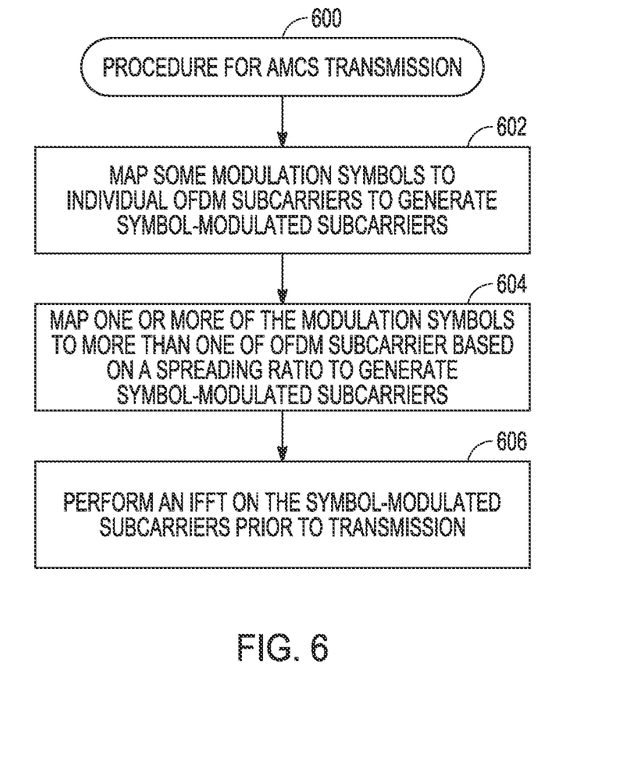
FIG. 6 illustrates a procedure for AMCS transmission in accordance with some embodiments.

FIG. 6 illustrates a procedure 600 for AMCS transmission in accordance with some embodiments. Procedure 600 may be performed by an AMCS transmitter, such as AMCS transmitter 400 (FIG. 4). In operations 602 and 604, modulation symbols are mapped to a plurality of OFDM subcarriers to generate symbol-modulated subcarriers. In these embodiments, some of the modulation symbols are mapped to individual subcarriers (operation 602) and one or more of the modulation symbols are mapped to more than one of the subcarriers based on a spreading ratio (operation 604). In operation 606, an IFFT is performed on the symbol-modulated subcarriers prior to transmission to generate a time-domain signal.

Some embodiments are directed to a method of generating and transmission AMCS signals. Some embodiments are directed to receiving and decoding AMCS signals.

The antennas may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the AMCS transmitter and AMCS receiver are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for an adaptive modulation, coding and spreading (AMCS) transmitter, the apparatus comprising: processing circuitry; and memory, wherein the processing circuitry is configured to:
   map modulation symbols to a plurality of orthogonal frequency division multiplexed (OFDM) subcarriers to generate symbol-modulated subcarriers, wherein some of the modulation symbols are mapped to individual subcarriers, and wherein one or more of the modulation symbols are mapped to more than one of the subcarriers based on a spreading ratio; and
   perform an inverse Fast Fourier Transform (IFFT) on the symbol-modulated subcarriers prior to transmission.

2. The apparatus of claim 1, wherein the plurality of OFDM subcarriers comprises a first set of OFDM subcarriers and a second set of OFDM subcarriers, each set comprising more than one subcarrier, and
   wherein some of the modulation symbols are each mapped to a single one of the subcarriers of the first set; and
   wherein the one or more other modulation symbols are mapped to groups of two or more subcarriers of the second set.

3. The apparatus of claim 2, wherein the processing circuitry is further configured to select the subcarriers for the first set and the second set based on a performance metric associated with a channel response, and
   wherein subcarriers meeting the performance metric are selected to be in the first set, and subcarriers not meeting the performance metric are selected to be in the second set.

4. The apparatus of claim 3, wherein the performance metric comprises a signal-to-noise ratio (SNR) (e.g., an SNR threshold), and wherein subcarriers that fall below a SNR threshold are selected to be in the second set.

5. The apparatus of claim 3, wherein the processing circuitry is configured to select a modulation and coding scheme for each the subcarriers of the first set based, at least in part, on the performance metric, and
   wherein for the subcarriers of the second set, the processing circuitry is further configured to select either a lowest or predetermined MCS level (e.g., BPSK).

6. The apparatus of claim 5, wherein the processing circuitry is configured to:
   identify subcarriers of the first set in which a data transmission rate based on the selected MCS level is less than an achievable data transmission rate, the achievable data transmission rate determined based on the performance metric;
   select a next higher MCS level for the modulation symbol for the identified subcarrier; and
   map the modulation symbol to the identified subcarrier of the first set and to one or more subcarriers of the second set.

7. The apparatus of claim 5, wherein for the subcarriers of the second set, the processing circuitry is configured to select an MCS level and the spreading ratio, the spreading ratio indicating a number of subcarriers of the second set over which a modulation symbol is mapped across.

8. The apparatus of claim 7, wherein for the subcarriers of the second set, the MCS level and the spreading ratio are selected to maximize a number of modulation symbols for transmission on the subcarriers of the second set.

9. The apparatus of claim 8, wherein the channel response comprises channel feedback for each of the subcarriers or groups of the subcarriers, the feedback provided by a AMCS receiver.

10. The apparatus of claim 8, wherein the processing circuitry is configured to predict the channel response.

11. The apparatus of claim 1, wherein the processing circuitry comprises:
    an adaptive modulation, coding and spreading (AMCS) controller,
    adaptive modulation and encoding (AMC) circuitry to encode an input bit stream and generate the modulation symbols based on an MCS level;
    a symbol mapper to map the modulation symbols to subcarriers to generate a frequency domain signal comprising the symbol-modulated subcarriers;
    IFFT circuitry to perform an IFFT on the symbol-modulated subcarriers to generate a time-domain output signal for subsequent upconversion to an RF frequency for transmission,
    wherein the AMCS controller is configured to:
    select the subcarriers for the first set and select the subcarriers for the second set based on a performance metric associated with a channel response,
    determine the MCS level for the AMC circuitry, and
    determine a spreading ratio for subcarriers of the second set and provide control signalling to the symbol mapper to indicate the spreading ratio and to indicate which subcarriers are in the second set,
    wherein the symbol mapper is configured to map one or more other modulation symbols to the subcarriers of the second set based on the spreading ratio, and
    wherein the memory is configured to store the MCS level for each subcarrier of the first set and the spreading ratios for the subcarriers of the second set.

12. A non-transitory computer-readable storage medium that stores instructions for execution by processing circuitry an adaptive modulation, coding and spreading (AMCS) transmitter, wherein the processing circuitry is configured to:
    map modulation symbols to a plurality of OFDM subcarriers to generate symbol-modulated subcarriers, wherein some of the modulation symbols are mapped to individual subcarriers, and wherein one or more of the modulation symbols are mapped to more than one of the subcarriers based on a spreading ratio; and
    perform an IFFT on the symbol-modulated subcarriers prior to transmission.

13. The non-transitory computer-readable storage medium of claim 12, wherein the plurality of OFDM subcarriers comprises a first set of OFDM subcarriers and a second set of OFDM subcarriers, each set comprising more than one subcarrier, and wherein some of the modulation symbols are each mapped to a single one of the subcarriers of the first set; and wherein the one or more other modulation symbols are mapped to groups of two or more subcarriers of the second set.

14. The non-transitory computer-readable storage medium of claim 13, wherein the processing circuitry is further configured to select the subcarriers for the first set and the second set based on a performance metric associated with a channel response, and wherein subcarriers meeting the performance metric are selected to be in the first set, and subcarriers not meeting the performance metric are selected to be in the second set.

15. The non-transitory computer-readable storage medium of claim 14, wherein the performance metric comprises a signal-to-noise ratio (SNR) (e.g., an SNR threshold), and wherein subcarriers that fall below a SNR threshold are selected to be in the second set.

16. The non-transitory computer-readable storage medium of claim 14, wherein the processing circuitry is configured to select a modulation and coding scheme for each the subcarriers of the first set based, at least in part, on the performance metric, and wherein for the subcarriers of the second set, the processing circuitry is further configured to select either a lowest or predetermined MCS level (e.g., BPSK).

17. The non-transitory computer-readable storage medium of claim 16, wherein the processing circuitry is configured to:

identify subcarriers of the first set in which a data transmission rate based on the selected MCS level is less than an achievable data transmission rate, the achievable data transmission rate determined based on the performance metric;

select a next higher MCS level for the modulation symbol for the identified subcarrier; and map the modulation symbol to the identified subcarrier of the first set and to one or more subcarriers of the second set, wherein for the subcarriers of the second set, the processing circuitry is configured to select an MCS level and the spreading ratio, the spreading ratio indicating a number of subcarriers of the second set over which a modulation symbol is mapped across.

18. An apparatus for an adaptive modulation, coding and spreading (AMCS) receiver, comprising: processing circuitry; and memory, wherein the processing circuitry is configured to:

perform a fast-Fourier transform (FFT) on a received OFDM signal to generate a frequency domain signal comprising a plurality of symbol-modulated OFDM subcarriers; and demap the symbol-modulated subcarriers to generate modulation symbols based on control signalling, wherein some of the modulation symbols are generated from individual subcarriers, and wherein some of the modulation symbols are generated from more than one of the subcarriers based on a spreading ratio.

19. The apparatus of claim 18, wherein the memory is configured to store the control signalling, the control signalling indicating subcarriers of a first set that were mapped with single modulations symbols and indicating subcarriers of a second set that were mapped with spread modulation symbols.

20. The apparatus of claim 19, wherein for each subcarrier of the first set, the control signalling indicates a modulation and coding scheme (MCS) for use in generating decoded bits, and wherein for the subcarriers of the second set, the control signalling indicates which subcarriers that a modulation symbol are spread across and a MCS associated with those subcarriers.

* * * * *